(12) United States Patent
Chow et al.

(10) Patent No.: US 11,102,303 B2
(45) Date of Patent: Aug. 24, 2021

(54) AUTOMATED IMPLEMENTATION OF PROVISIONED SERVICES BASED ON CAPTURED SENSOR DATA

(71) Applicant: The Toronto-Dominion Bank, Toronto (CA)

(72) Inventors: Arthur Carroll Chow, Toronto (CA); Paul Mon-Wah Chan, Markham (CA); Perry Aaron Jones Haldenby, Toronto (CA); Rakesh Thomas Jethwa, Toronto (CA); Eddie Cheuk Long Law, Toronto (CA); John Jong Suk Lee, Waterloo (CA); Stephen John McCann, Toronto (CA); Haituyen Anthony Nguyen, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/666,951

(22) Filed: Oct. 29, 2019

(65) Prior Publication Data

US 2020/0068022 A1 Feb. 27, 2020

Related U.S. Application Data

(63) Continuation of application No. 15/281,479, filed on Sep. 30, 2016, now Pat. No. 10,498,827.

(51) Int. Cl.
*G06F 7/00* (2006.01)
*H04L 29/08* (2006.01)
(Continued)

(52) U.S. Cl.
CPC .............. *H04L 67/12* (2013.01); *G06Q 20/10* (2013.01); *G06Q 20/4014* (2013.01);
(Continued)

(58) Field of Classification Search
USPC ......................................................... 235/375
See application file for complete search history.

(56) References Cited

U.S. PATENT DOCUMENTS 7,194,543 B2 3/2007 Corneille et al.
7,324,976 B2 1/2008 Gupta et al.
(Continued)

FOREIGN PATENT DOCUMENTS

EP 1693804 8/2006
WO WO2013112642 8/2013

OTHER PUBLICATIONS

"Open-source Internet of Things micropayment processing hits the market," Bitcointalk.org, Jul. 2015 (retrieved from https://bitcointalk.org/index.php?topic=854280.460;imode on Sep. 30, 2016), 3 pages.
(Continued)

*Primary Examiner* — Tuyen K Vo
(74) *Attorney, Agent, or Firm* — Duane Morris LLP

(57) ABSTRACT

The disclosed embodiments include computer-implemented systems and processes that perform operations consistent with services provisioned to a device based on real-time sensor data indicative of and characterizing a user's operation of the device and additionally or alternatively, a system or apparatus that includes the device. For example, the device may obtain stored data identifying a provisioned service, and may obtain sensor data captured by an on-board or external sensor during an operation of the device. Based on the sensor data, the device may generate a usage parameter that characterizes the operation of the device during a temporal period, and perform an operation consistent with the provisioned service in accordance with the generated usage parameter.

20 Claims, 4 Drawing Sheets

(51) Int. Cl.
*G06Q 20/40* (2012.01)
*G06Q 20/10* (2012.01)
*G06Q 30/02* (2012.01)
*H04L 29/06* (2006.01)

(52) U.S. Cl.
CPC ..... *G06Q 30/0283* (2013.01); *H04L 65/1069* (2013.01); *H04L 67/18* (2013.01)

(56) References Cited

U.S. PATENT DOCUMENTS

| | | | |
|---|---|---|---|
| 8,150,769 | B2 | 4/2012 | Gupta et al. |
| 8,799,036 | B1 | 8/2014 | Christensen |
| 9,460,573 | B1* | 10/2016 | Cordes ............... G06K 7/10138 |
| 2001/0037298 | A1 | 11/2001 | Ehrman |
| 2002/0111907 | A1 | 8/2002 | Ling |
| 2002/0128917 | A1 | 9/2002 | Grounds |
| 2003/0126079 | A1 | 7/2003 | Roberson et al. |
| 2006/0242038 | A1 | 10/2006 | Guidilli |
| 2010/0042340 | A1 | 2/2010 | Piszko |
| 2015/0371548 | A1 | 12/2015 | Samid |
| 2016/0071082 | A1 | 3/2016 | Driscoll |
| 2016/0093216 | A1 | 3/2016 | Lee |
| 2017/0357980 | A1* | 12/2017 | Bakun ..................... H04W 4/70 |

OTHER PUBLICATIONS

"How it works," retrieved from https://toronto.car2go.com/how-it-works/ on Sep. 30, 2016, 8 pages.

Karame et al., "Pay as you Browse" Microcomputations as Micropayments in Web-based Services, Proceedings of WWW 2011, 2011, pp. 307-216.

Ectors, "Five new business for Telefonica Digital," Sep. 21, 2011 (retrieved from https://telruptive.com/tag/micro-payment on Sep. 30, 2016), 1 page.

Dawson, "The new layer of the economy enabled by M2M payments in the Internet of Things," Sep. 16, 2014 (retrieved from https://rossdawsonblog.com/weblog/archieves/2014/09/new-layer-economy-enabled-m2m-payments-internet-things.html on Sep. 30, 2016), 7 pages.

* cited by examiner

AUTOMATED IMPLEMENTATION OF PROVISIONED SERVICES BASED ON CAPTURED SENSOR DATA

CROSS-REFERENCE TO RELATED APPLICATION

This application is a continuation of and claims the benefit of priority to U.S. application Ser. No. 15/281,479, filed Sep. 30, 2016, the disclosure of which is incorporated by reference herein to its entirety.

TECHNICAL FIELD

The disclosed embodiments generally relate to computer-implemented systems and processes that automatically perform operations consistent with provisioned software-based services in accordance with captured sensor data.

BACKGROUND

Today, as the vision of a shared economy becomes reality, processes that enable customers to "pay-per-use" resources are increasingly common across platforms ranging from shared vehicles to shared kitchen resources. For example, in some vehicle-sharing platforms, a credit card of a driver may be charged based on a distance travelled in a shared vehicle or a time of operation. Further, when utilizing shared kitchen resources, a user's credit card may be charged on a temporal basis for any shared equipment or resources consumed during a particular usage session.

SUMMARY

The disclosed embodiments include computer-implemented systems and processes that perform operations consistent with services provisioned to a device based on real-time sensor data indicative of and characterizing a user's operation of the device and additionally or alternatively, a system or apparatus that includes the device.

In an embodiment, a device may include a storage unit storing instructions, a first sensor configured to detect a first device parameter, and at least one processor coupled to the first sensor and the storage unit. The at least one processor may be configured to execute the instructions to obtain service data identifying a service provisioned to the device and to obtain first sensor data captured by the first sensor during an operation of the device. In some aspects, the first sensor data may be indicative of values of the first device parameter. Based on the first sensor data, the at least one processor may be further configured to execute the instructions to generate a usage parameter that characterizes the operation of the device during a temporal period, and to perform an operation consistent with the provisioned service in accordance with the generated usage parameter.

In other embodiments, a computer-implemented method may include obtaining, by at least one processor, data identifying a service provisioned to a device, the device comprising a sensor configured to detect a device parameter, and obtaining, by the at least one processor, sensor data captured by the sensor during an operation of the device. In some aspects, the sensor data may be captured by the sensor during an operation of the device, and may be indicative of values of the device parameter. Based on the sensor data, the method may also include generating, by the at least one processor, a usage parameter that characterizes the operation of the device during a temporal period, and performing, by the at least one processor, an operation consistent with the provisioned service in accordance with the generated usage parameter.

Further, in certain embodiments, a system may include a plurality of first sensors and a communications device. In some aspects, the first sensors may be configured to detect first device parameters, and the communications device may include a storage unit storing instructions and at least one processor coupled to the storage unit and the first sensors. The at least one processor may be configured to execute the instructions to obtain data indicative of a service provisioned to the communications device, and obtain first sensor data captured by corresponding ones of the first sensors during an operation of the system. In additional aspects, the first sensor data may be indicative of values of corresponding ones of the first device parameters. Based on the first sensor data, the at least one processor may be further configured to execute the instructions to generate a usage parameter that characterizes the operation of the system during a temporal period, and to perform an operation consistent with the provisioned service in accordance with the generated usage parameter.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1A:
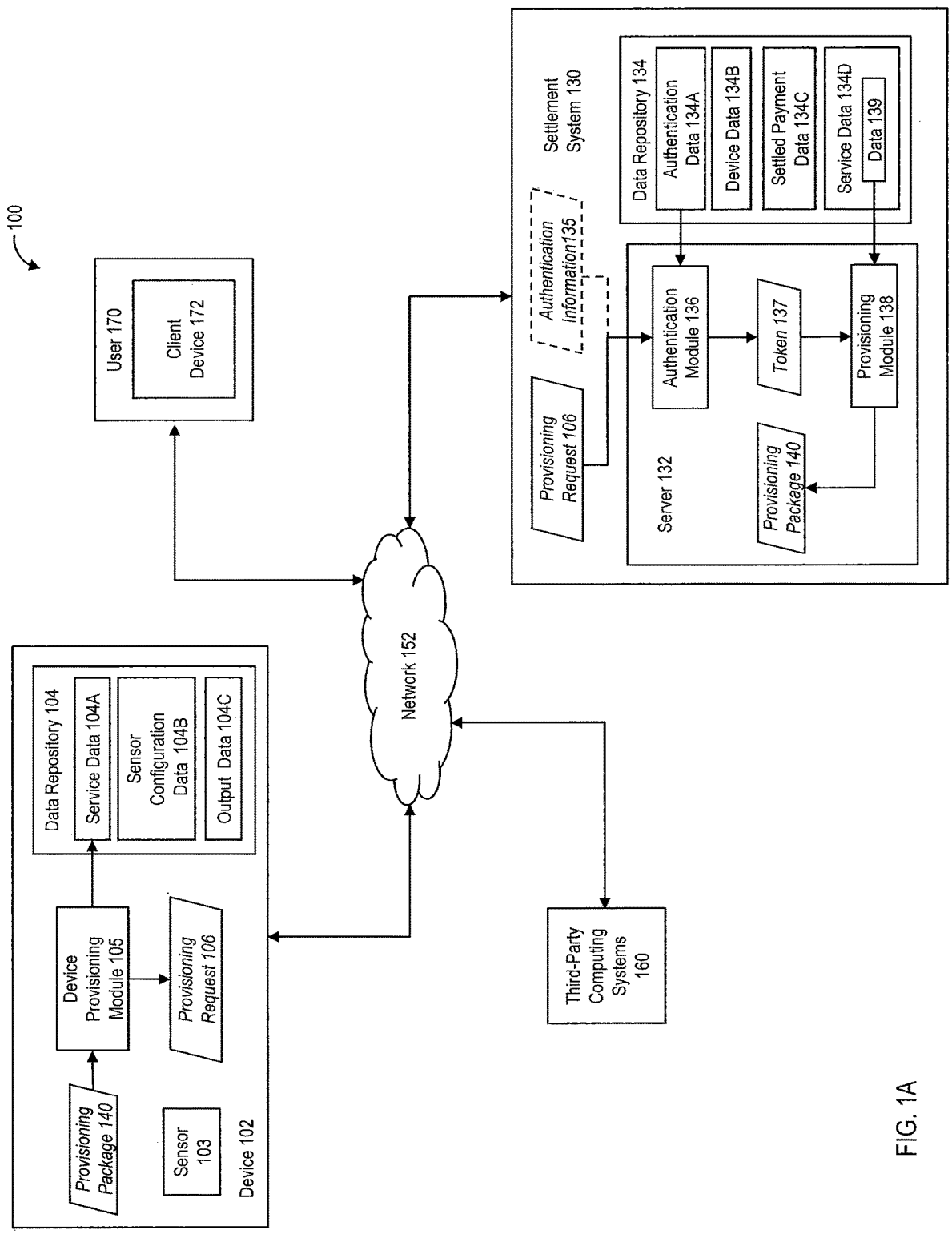
FIGS. 1A and 1B are diagrams of exemplary computing environments, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary computer-implemented systems and processes that perform operations consistent with services provisioned to a device based on real-time sensor data indicative of, and characterizing a user's operation of, the device and additionally or alternatively, a system or apparatus that includes the device. By way of example, and as described below, the device may include, or be in communications with, one or more sensors configured to detect values of various resource-specific parameters during corresponding monitoring periods. Based on obtained tariff data, the device may initiate one or more payment transactions, e.g., "micro-payment" transactions, that reflect actual costs associated with changes in the monitored, resource-specific parameter values during successive temporal intervals, e.g., "payment" periods, and thus, reflect the actual costs associated with a consumption of certain resources during these successive payment intervals.

In one instance, one or more devices may be incorporated within a vehicle rented by the user over a particular rental period, e.g., a rental period of one hour. These devices may be characterized by varying processing, storage, interface, and/or communications functionalities, and in some aspects, the one or more devices may include a connected, Internet-of-Things (Iot) device. Further, each device may include one or more sensors configured to monitor and capture data indicative of values of various parameters at corresponding monitoring periods, which, in certain instances, reflect a consumption of various vehicle-specific resources during the user's operation of the rental vehicle. For example, the monitored parameters may include, but are not limited to, a working speed of the vehicle's engine at each of the successive monitoring periods (e.g., as measured in revolutions-per-minute (RPM)), an odometer reading of the vehicle at each of the successive monitoring periods, a number of shifting operations initiated by an electronic or manual transmission at each of the successive monitoring periods, metrics indicative of a usage of the vehicle's braking system at each of the successive monitoring periods (e.g., a brake pad thickness or a number of detected activations of an antilock braking system (ABS)), and/or a level of available fuel at each of the successive monitoring periods.

Further, changes in the values of the monitored parameters over each of the successive payment periods may provide a more accurate reflection of an actual wear-and-tear imposed on the vehicle due to the user's operation than coarser metrics, such as a length of the rental period or a distance driven by the user during the rental period. Further, the periodic micro-payment transactions may collectively reflect a true cost associated with that actual wear-and-tear imposed upon the vehicle, as defined across multiple usage variables, and may also provide a different rental cost for each renter based on a corresponding driving style, e.g., parameters indicative of the consumption of vehicle-specific resources. These exemplary computer-implemented processes, as described and claimed below, may be performed by devices and other computing systems in addition to, or as an alternate to, other processes that characterize the usage of the rental vehicle using coarser, time-averaged metrics, such as the length of the rental period or the distance driven by the user during the rental period.

I. Exemplary Computing Environments

Figure 1B:
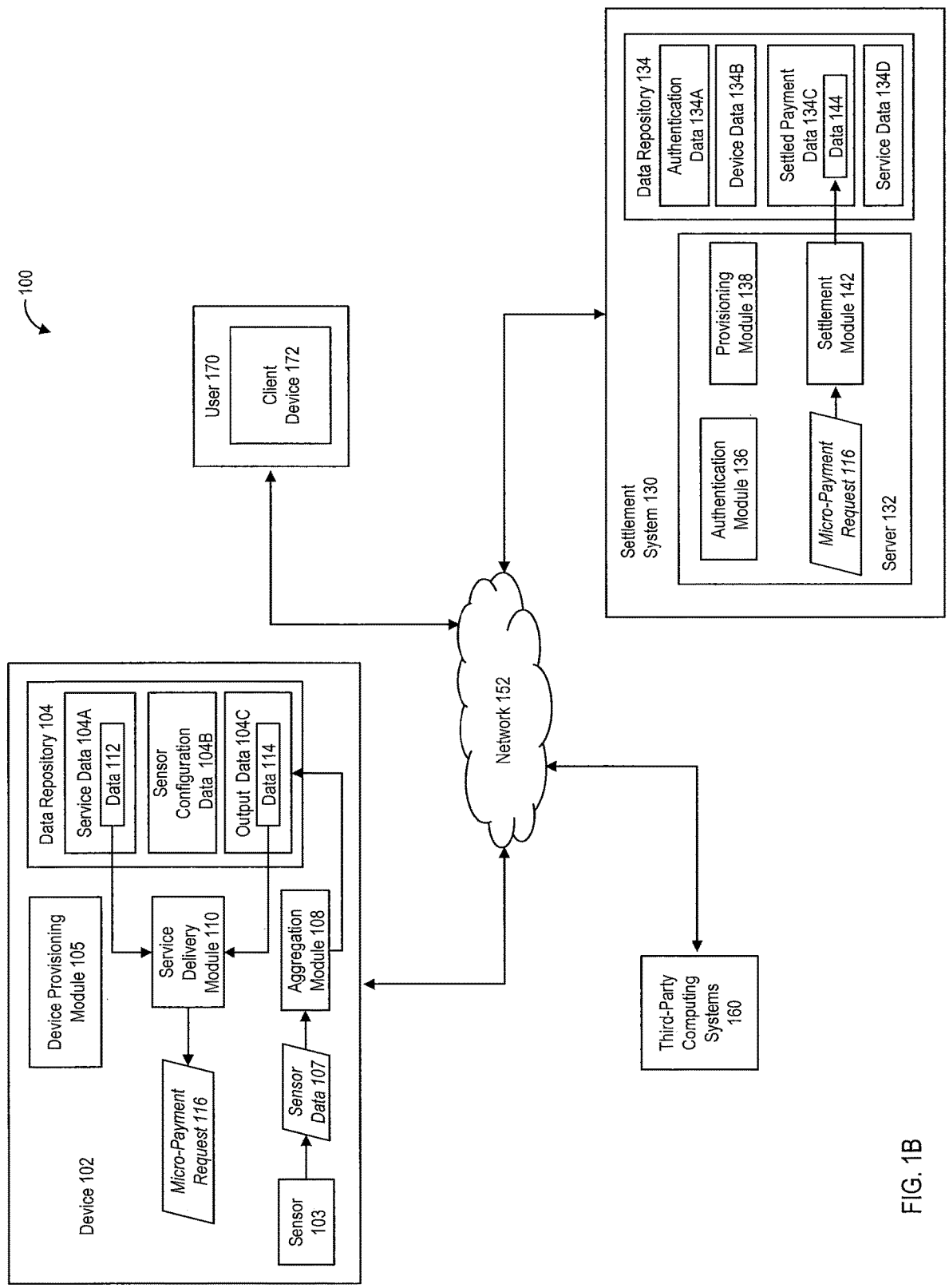

FIGS. 1A and 1B are diagrams illustrating an exemplary computing environment 100, consistent with certain disclosed embodiments. In some aspects, as illustrated in FIGS. 1A and 1B, environment 100 may include one or more devices, e.g., device 102, a settlement system 130, one or more third-party computing systems 160, and a client device 172, which may be interconnected through any appropriate combination of communications networks, such as network 152. Examples of network 152 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In an embodiment, device 102 may be associated with a user, e.g., user 170, and may correspond to a computing device that includes one or more tangible, non-transitory memories that store data and/or software instructions, and one or more processors configured to execute software instructions. The stored software instructions may, in some aspects, include one or more applications or application modules that, when executed by the one or more processors, cause device 102 to perform operations consistent with the disclosed embodiments. Device 102 may also include a communications module, such as a wireless transceiver device, coupled to the one or more processors and configured by the one or more processors to establish and maintain communications with network 152.

In some aspects, device 102 may include a computing device characterized by various processing, storage, interface, and/or communications capabilities. For example, computing devices consistent with the disclosed embodiments may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, etc.), an embedded computing device, a networking device (e.g., a router), and/or a vehicle-based computing device.

In additional aspects, device 102 may correspond to a connected, Internet-of-Things (IoT) device, which may access network 152 through a corresponding hub device or system (not depicted in FIG. 1A or 1B) configured to manage communications and interactions between the connected IoT device and other components of environment 100, such as settlement system 130. Connected IoT devices consistent with the disclosed embodiments may include, but are not limited to, a wireless printer or copy machine, a wired or wireless network router, a network-connected lighting fixture, a network-connected appliance, a network-connected, smart thermostat, and/or a network-connected component of a security or access-control system.

Referring back to FIGS. 1A and 1B, device 102 may also include one or more on-board or embedded sensor devices, e.g., sensor 103, which may be configured to monitor and capture data indicative of values of one or more parameters characterizing an operation of device 102, and additionally or alternatively, of an apparatus or system into which device 102 is incorporated, during discrete temporal intervals, e.g., "monitoring" periods. Sensors consistent with the disclosed embodiments may include, but are not limited to, a positional sensor (e.g., a global positioning sensor (GPS) unit), an accelerometer or other motion sensor, a temperature sensor, a sensor configured to monitor a quantity of digital data received and/or transmitted by device 102, a sensor configured to monitor a quantity of a resource consumed by device 102 (e.g., electricity, water, natural gas, etc.), a sensor configured to detect an change in an operational state of device 102 (e.g., to detect an activation of device 102 and/or a connection of device 102 to a source of electrical energy), a sensor configured to detect particular chemical compounds or particulates within a liquid or gas sample, and any additional or alternate sensor device appropriate for inclusion as a component of device 102.

Further, in certain aspects, device 102 may be incorporated into and function as a component of an additional system or apparatus, and sensor 103 may be configured to monitor and/or detect one or more operation characteristics of that additional system or apparatus. For example, device 102 may be included into a motor vehicle, such as the rental vehicle described above, and sensor 103 may be configured to monitor and capture data indicative of operational parameters of the vehicle, which include, but are not limited to, a working speed of the vehicle's engine, a number of shifting operations, a brake-pad thickness or a number of detected activations of an antilock braking system (ABS)), and/or consumption of fuel by the vehicle at the successive monitoring periods. In other instances, device 102 may be included within a network-accessible device, such as a wireless router and/or a wireless printer, and sensor 103 may be configured to monitor a quantity and/or a type of data transmitted or received by the wireless router and/or a wireless printer, and additionally or alternatively, monitor operations performed in response to that transmitted or received data, e.g., a number of pages printed by the wireless printer. The disclosed embodiments are not limited to these exemplary sensors or configurations, and in further embodiments, sensor 103 may include any additional or alternate type of sensor configured to monitor and capture data indicative of any additional or alternate operational, resource-based, or environmental parameter appropriate to device 102 and/or to any additional system or apparatus that incorporates device 102.

Additionally, and as illustrated in FIGS. 1A and 1B device 102 may maintain a data repository, e.g., data repository 104, within one or more of the tangible, non-transitory memories. Data repository 104 may, for example, include service data 104A, which stores data supporting a performance of operations consistent with one or more provisioned services by device 102, as described below. Data repository 104 may also include sensor configuration data 104B that for sensor 103 and any additional or alternate sensor, specifies a unique sensor identifier (e.g., a serial number, etc.) and further, data characterizing a corresponding sensor type and the one or more parameters monitored or detected by that sensor type (e.g., a tachometer that measures a working speed of an engine in revolutions-per-minute (RPM), etc.). Data repository 124 may also include sensor output data 104C, which stores data captured by sensor 103 and any additional or alternate sensor during corresponding ones of the monitoring periods.

Settlement system 130 may, in some aspects, represent a computing system configured to execute software instructions (e.g., one or more executable application modules) that perform operations consistent with disclosed embodiments. For example, and as described below, settlement system 130 may provide, to device 102 (and to similar devices operating within environment 100), elements of executable code (e.g., application modules, etc.), service-related cryptograms, authentication tokens, and other service-related data that enable device 102 to perform operations consistent with one or more available services. Device 102 may receive and store the executable code elements, service-related cryptograms, authentication tokens, and/or other service-related data within the one or more tangible, non-transitory memories, which may provision device 102 with the available services. In some instances, settlement system 130 may be associated with a financial institution, and the available services may include a payment service that enables device 102 to initiate one or more periodic micro-payment transactions reflecting a consumption of device-specific resources (e.g., as monitored by sensor 103), which settlement system 130 may process and settle in conjunction with one or more of third-party computing systems 160.

In one instance, settlement system 130 may include one or more servers (e.g., server 132) and tangible, non-transitory memory devices storing executable code and application modules. Further, server 132 may include one or more processor-based computing devices, which may be configured to execute portions of the stored code or application modules to perform operations consistent with the disclosed embodiments, including operations consistent with the exemplary micropayment settlement processes described herein. In other instances, and consistent with the disclosed embodiments, settlement system 130 may correspond to a distributed system that may include computing components distributed across one or more networks, such as network 152, or other networks, such as those provided or maintained by cloud-service providers.

As illustrated in FIGS. 1A and 1B, settlement system 130 may maintain a data repository 134 (e.g., within one or more of the tangible, non-transitory memories) that includes authentication data 134A, device data 134B, and settled payment data 134C. In some aspects, authentication data 134A may include data identifying one or more authentication credentials associated with corresponding users (e.g., user 170), such as alpha-numeric user names, alpha-numeric passwords, biometric credentials, etc. Additionally, device data 134B may include one or more unique identifiers of devices, e.g., device 102, that are registered onto network 152 and further, are associated with verified device identifiers and authenticated owner identifiers eligible to receive data provisioning the one or more available services. Further, settled payment data 134C may, include, but it not limited to, data identifying one or more settled micropayment transactions involving corresponding accounts of user 170.

In other aspects, data repository 134 may also include service data 134D associated with one or more services available for provisioning to device 102 and additionally or alternatively, to other devices operating within environment 100. Settlement system 130 may, in some instances, obtain portions of service data 134D from one or more of third-party computing systems 160, e.g., in response to a request delivered through a programmatic interface (e.g. an application programming interface (API)) or through data pushed by the one or more of third-party computing systems 160 at predetermined intervals). As described above, service data 134D may include, but is not limited to, elements of executable code (e.g., application modules, etc.), service-related cryptograms, authentication tokens, and/or other service-related data that facilitate a performance of operations consistent with the one or more available services by device 102.

By way of example, the one or more available services may include, but are not limited to, a payment service that, when provisioned to device 102, enables device 102 to perform operations that initiate periodic micro-payment transactions reflecting changes in monitored parameter values and additionally or alternatively, a consumption of one or more device-, system-, and/or apparatus-related resources, at the successive payment periods. Further, and as described above, service data 134D may include payment-service data, such as executable application modules, payment-service cryptograms, authentication tokens, and other data that facilitates the initiation of periodic micro-payment transactions by device 102, and the back-end processing and settlement of the initiated micro-payment transactions by settlement system 130. In some instances, the portions of the payment-service data may, among other things, identify one or more accounts held by user 170 at a financial institution (e.g., which may maintain one or more of third party computing systems 160) and include payment-service cryptograms that enable device 102 and settlement system 130 to initiate and settle the periodic micro-payment transactions based on funds held within the one or more accounts of user 170.

In further aspects, the payment-service data, e.g., as stored within service data 134D, may include tariff data that assigns financial costs to corresponding units of time-evolving parameters and/or consumed resources. As described above, sensor 103 of device 102 may be configured to monitor and capture data indicative of values of one or more parameters of device 102, and additionally or alternatively, of an apparatus or system into which device 102 is incorporated, at or during the successive monitoring periods. In some aspects, changes in these parameters over the multiple monitoring periods, (e.g., which collectively establish the payment periods for the micro-payment transactions) may be indicative of a consumption of a particular device-, apparatus-, and/or system-specific resource during the multiple monitoring periods, and the tariff data may assign a particular cost to each unit of these consumed device-, apparatus-, and/or system-specific resources. Through the assignment of specific, unit costs to each consumed resource, the disclosed embodiments may enable device 102, in conjunction with settlement system 130, to initiate and settle periodic micro-payment transactions that accurately reflect the actual, granular consumption of the device-, apparatus-, and/or system-specific resources during the corresponding payment periods.

In certain aspects, third-party computing systems 160 may include one or more individual computing systems, each of which may include computing components configured to store, maintain, and generate data and software instructions. For example, each of third-party computing systems 160 may include one or more computing devices, which may be configured to execute elements of code and/or software instructions (e.g., application modules) stored in tangible, non-transitory mediums. Further, in some instances, third-party computing systems 160 may be associated with or maintained by one or more business entities, and may be configured to supply data associated with one or more available services (e.g., elements of executable code, service-related cryptograms, authentication tokens, tariff data, etc.) to settlement system 130, e.g., for storage within corresponding portions of service data 134D. In some instances, the business entity may correspond to a financial institution that holds one or more accounts on behalf of user 170, and one or more of third-party computing systems 160 may supply data to settlement system 130 that facilitates a provisioning of the exemplary payment services described herein.

In some embodiments, client device 172 may be a computing device, such as, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, client device 172 may be associated with one or more users, such as user 170. For instance, user 170 may operate client device 172 and may do so to cause client device 172 to perform one or more operations consistent with the disclosed embodiments.

Client device 172 may, in some aspects, include one or more tangible, non-transitory memories that store data and/or software instructions, and one or more processors configured to execute software instructions. Client device 172 may include one or more display devices that display information to a user and one or more input device(s) to allow user 170 to input information to client device 172 (e.g., keypad, keyboard, touchscreen, voice activated control technologies, or any other type of known input device). Additionally, in certain aspects, client device 172 may store in memory one or more software applications that run on client device 172 and are executed by the one or more processors, such as web browsers and various applications associated with settlement system 130, as described below.

II. Exemplary Computer-Implemented Processes for Automatically Performing Operations Based on Captured Sensor Data In some embodiments, device 102, in conjunction with settlement system 130, may perform operations that consistent with one or more provisioned services based on sensor data captured in real-time by sensor 103. These performed operations may, in certain instances, generate data that characterize an actual consumption of a particular resource (e.g., an actual usage of device 102 and additionally or alternatively, an apparatus or system into which device 102 is incorporated by user 170) during successive time periods, e.g., payment intervals, based values of multiple, resource-specific parameters monitored and captured by sensor 103 in real-time.

For example, and as described below, the provisioned service may correspond to a payment service enabling device 102, in conjunction with settlement system 130, to perform operations that initiate and settle periodic micro-payment transactions reflecting changes in monitored values of certain resource-specific parameters during successive payment intervals. In some instances, the changes in the monitored values of the resource-specific parameters may accurately reflect an actual consumption of the particular resource during the successive time periods (e.g., an actual "wear and tear" of a vehicle operated by user 170 throughout the successive time periods, and device 102 and/or settlement system 130 may perform any of the exemplary processes described herein, in addition to, or as an alternate to, other computer-implemented processes that characterize the consumption of the particular resource based on values of global parameters, such as an aggregate time of operation.

A. Exemplary Processes for Provisioning Devices with Available Services

In certain aspects, depicted in FIG. 1A, a user associated with device 102, e.g., user 170, may activate device 102, and device 102 may perform operations that establish communications with network 152. Further, a device provisioning module 105 of device 102 may generate transmit a request, e.g., a provisioning request 106, for one or more available services to settlement system 130 across network 152. In one instance, and as described above, device 102 may correspond to a connected, IoT device, and an activation module of the connected IoT device (not shown in FIG. 1) may establish communications across a corresponding network with a hub device (also not shown in FIG. 1), which may authenticate and verify an identity of the connected IoT device. In response to a successful authentication, a relay module of the hub device may perform operations that relay the provisioning request to settlement system 130, as described above.

Settlement system 130 may receive provisioning request 106, and in some aspects, may authenticate an identity of a user associated with device 102, e.g., user 170, prior to performing operations that provision one or more available services to device 102. In one aspect, the received provisioning request may include data, such as one or more authentication credentials of user 170, that facilitates that authentication of user 170 by settlement system. For example, device 102 may include an interface unit, such as a touchscreen display unit, that presents a graphical user interface (GUI) prompting user 170 to input one or more authentication credentials (e.g., a user name, a password, etc.). Device 102 may receive the authentication credentials, and may perform operations that package the received authentication credentials into the provisioning request, along with additional data that uniquely identifies device 102, such as a corresponding device serial number.

In other instances, and as described above, device 102 may correspond to a connected IoT device, which may not include an interface unit, or may include an interface unit that is incapable of receiving authentication credentials from user 170. In come aspects, user 170 may access, through client device 172, a web page or other digital portal associated with settlement system 130 (e.g., a graphical user interface (GUI) generated by a mobile application provided by or associated with settlement system 130), which may prompt user 170 to provide, to client device 172, the one or more authentication credentials in conjunction with data that uniquely identifies device 102, such as the device serial number described above. Client device 172 may receive the one or more authentication credentials and the identifying data, which may be packaged with data identifying client device 172 into authentication information 135, and transmitted to settlement system 130 across communications network 152. Settlement system 130 may receive authentication information 135, and as described below, perform operations that authenticate the identity of user 170.

For example, as illustrated in FIG. 1A, an authentication module 136 of server 132 may, in some instances, process provisioning request 106 and additionally or alternatively, authentication information 135, and extract the one or more authentication credentials and the unique identifier of device 102. Authentication module 136 may, in some aspects, access authentication data 134A if data repository 134 (and additionally or alternatively, one or more data repositories accessible across network 152, such as those maintained by third-party computing systems 160), and obtain data identifying one or more stored authentication credentials associated with or assigned to user 170, and may perform operations that compare the one or more extracted authentication credentials against the one or more stored authentication credentials to authenticate an identity of user 170. Extracted and stored authentication credentials consistent with the disclosed embodiments may include, but are not limited to, an alpha-numeric user name or login associated with user 170, an alpha-numeric password associated with user 170, and one or more biometric credentials associated with user 170 (e.g., a digital image corresponding to user 170's fingerprint, a digital image of user 170's face, etc.).

In certain aspects, and upon an identification of a match between the extracted and stored authentication credentials, authentication module 136 may authenticate the identity of user 170 and generate data indicative of the successful authentication. For example, the generated data may include, but is not limited to, a digitally signed token (e.g., token 137) generated using a corresponding asymmetric cryptographic scheme, and authentication module 136 may store token 137 within a corresponding portion of data repository 134. Additionally, and as described below, token 137 may be provided to device 102, and to other devices associated with user 170, within a package of provisioned services, as described below.

In response to the authentication of user 170, authentication module 136 may input token 137 to a provisioning module 138 (e.g., through a corresponding programmatic interface or API), and provisioning module 138 may perform operations that obtain data associated with one or more services available for provisioning to device 102. For example, data repository 134 may include service data 134D, which includes structured data records that identify various services associated with user 170, and additionally or alternatively, with one or more authenticated users of settlement system 130. In some instances, each of the structured data records may be associated with and identify a corresponding one of the available services, and may include data characterizing sensor, storage, processing, and/or communications capabilities of one or more corresponding devices capable performing operations consistent with the available services. Additionally, each of the structured data records may be linked to additional stored data (e.g., in data repository 134), including elements of executable code (e.g., application modules, etc.), service-related cryptograms, and additional service-related data, which facilitate the performance of operations consistent with the available services.

In certain aspects, provisioning module 140 may access service data 134D, and may obtain portions of the structured data records corresponding to one or more of the services associated with authenticated user 170 and available for provisioning to device 102. For example, and as described above, the one or more available services may include a payment service that enables device 102 to initiate one or more periodic micro-payment transactions reflecting a consumption of device-specific resources (e.g., as monitored by sensor 103), which settlement system 130 may process and settle in conjunction with one or more of third-party computing systems 160.

In some embodiments, a periodically initiated micro-payment transaction, which reflects a real-time usage or consumption of certain device-specific, monitored resources, may lack an association with one or more previously settled micro-payment transactions. By way of example, the periodically initiated micro-payment transaction may reflect a consumption of device-specific resources different from those reflected by the previously settled micro-payment transactions, and may thus reflect an actual, real-time usage of device 102 or a system or apparatus that incorporates device 102.

Provisioning module 138 may, in some aspects, extract data (e.g., payment-service data 139) from service data 134D that includes structured data records identifying the available payment service, and further, elements of executable code, payment-service related cryptograms, tariff data, and other payment-service data that enable device 102 to perform operations that initiate the periodic micro-payment transactions in accordance with the monitored parameter values and the tariff data, as described herein. The disclosed embodiments are, however, not limited to processes that provision device 102 with the available payment service, and in other aspects, the disclosed embodiments may provision device 102 with any additional or alternate service consistent with the capabilities of device 102, further, may provision any additional or alternate device with available services in response to a received provisioning request.

As illustrated in FIG. 1A, provisioning module 138 may perform operations that generate a provisioning package 140 that includes portions of obtained payment-service data 139 and additionally or alternatively, token 137. For example, provisioning package 140 may include, but is not limited to, data that identifies the available payment service, and further, the elements of executable code, payment-service cryptograms, and tariff data that enables device 102 to perform operations consistent with the available payment service (e.g., operations that initiate one or more periodic micro-payment transactions reflecting the consumption of device-specific resources, which settlement system 130 may process and settle in conjunction with one or more of third-party computing systems 160). Settlement system 130 may transmit provisioning package 140 to device 102 across network 152 using any of the exemplary processes described above.

Device 102 may receive provisioning package 140, and device provisioning module 140 may process provisioning package 140 and store data associated with the available payment service within a corresponding portion of data repository 104, e.g., service data 104A. For example, the stored payment-service data may include, but is not limited to, data identifying the available payment service, and elements of executable code, payment-service related cryptograms, authentication tokens, and/or tariff data that enable device 102 to perform operations that consistent with the available payment service. In some aspects, and upon storage of the payment-service data, device 102 may be provisioned within the available payment service and may be perform operations consistent with that provisioned payment service.

B. Exemplary Processes for Automatically Initiating and Settling Micro-Payment Transactions based on Obtained Sensor Data Referring to FIG. 1B, device 102 may, in certain aspects, access portions of the service data 104A, and based on the accessed service-data portions, may perform operations consistent with one or more provisioned services, such as the provisioned payment service described above. For example, the provisioned services may include a payment service that, when implemented by device 102, enables device 102 to initiate periodic micro-payment transactions that reflect a real-time, instantaneous usage or consumption of device-specific resources, e.g., based on values of certain resource-specific parameters monitored by sensor 103. In additional or alternate instances, one or more of the periodically initiated micro-payment transactions may reflect changes in the monitored values of certain resource-specific parameters detected by sensors 103 during successive payment periods.

The monitored values of the resource-specific parameters may, in some instances, accurately reflect an actual, real-time consumption of the particular resource (e.g., an actual "wear and tear" of a vehicle operated by user 170). Further, by initiating micro-payment transactions that account for the monitored parameter values at a particular point in time, or that account for corresponding changes in each of the monitored parameter values, the disclosed embodiments may assign costs to a user associated with device 102, e.g., user 170, that reflect the actual, real-time consumption of the particular resource.

In one instance, device 102 may be incorporated into a vehicle rented by user 170 for a corresponding rental period, and sensor 103 may be configured to monitor and capture sensor data, e.g., sensor data 107, at corresponding monitoring periods (e.g., every five second, thirty second, minute, etc.) throughout the rental period. For example, sensor 103 may correspond to a fuel-level sensor configured to monitor the vehicle's real-time consumption of liquid fuel, and sensor data 107 may include, for each monitoring period, data records that uniquely identify sensor 103 (e.g., a device serial number), a fuel level within a corresponding reservoir (e.g., a gas tank), and a time stamp associated with the detected fuel level. In certain instances, a data aggregation module 108 of device 102 may perform operations that store sensor data 107 within a corresponding portion of data repository 104, e.g., within sensor output data 104C.

Additionally, in certain aspects, a service delivery module 110 may access data repository 104 and extract, from service data 104A, portions of the executable code, payment-service related cryptograms, authentication tokens, and/or tariff data (e.g., payment-service data 112) enabling device 102 to perform operations that initiate a periodic micro-payment transaction that accounts for the amount of liquid fuel consumed in real time by the vehicle during each of a number of successive payment periods. In some aspects, each payment period may be associated with a predetermined duration, e.g., as established by a financial institution associated with settlement system 130 and additionally or alternatively, one or more of the business entities that maintain third-party computing systems 160, such as a company that rented the vehicle to user 170. The predetermined payment period may, for example, correspond to an instantaneous, real-time usage of the vehicle (e.g., at a particular time), and additionally or alternatively, may correspond to five minutes, thirty minutes, one hour, and any additional or alternate time period appropriate to device 102 and to the monitor resource and/or parameter value.

Further, and as described above, the extracted tariff data may identify a particular cost assigned to each unit of the consumed resource and/or to each unit of the monitored parameter values. These particular, resource-specific or parameter-specific costs may, in some instances, be assigned by a financial institution associated with settlement system 130 and additionally or alternatively, one or more of the business entities that maintain third-party computing systems 160, such as a company that rented the vehicle to user 170.

By way of example, service delivery module 110 may determine, based on the extracted tariff data, that the rental-vehicle company assigns a cost of $1.50 per liter of liquid fuel consumed by the rental vehicle during operation by user 170. In some aspects, the fuel cost, and any addition or alternate resource-specific or parameter-specific costs specified within the extract tariff data, may be fixed and remain unchanged over time, or may be adaptively modified to reflect time-varying changes in the vehicle's fuel consumption or in user 170's operation of the vehicle. For instance, the per-unit fuel cost may be reduced to incentive user 170 to operate the vehicle more frequently during the rental period.

In additional aspects, service delivery module 110 may establish, based on payment-service data 112, a periodic payment period of five minutes for initiating micro-payment transactions accounting for time-varying fuel consumption of the rental vehicle. Service delivery module 110 may perform operations that identify an expiration of a current payment period, and in response to the identified expiration, access data repository 104 and obtain a portion of sensor output data 104C indicative of the fuel consumed by the vehicle at discrete monitoring periods during the expired payment period (e.g., data portion 114). Service delivery module 110 may process data portion 114 to generate an aggregate amount of fuel consumed by the vehicle during the expired payment period, and based on the extracted tariff data, establish a usage parameter, e.g., a micro-payment amount, that reflects the actual cost of the fuel consumed by the vehicle during the expired payment period.

For example, sensor 103 may be associated with a five-second monitoring period, and data portion 114 may include sixty discrete data records identifying an amount of fuel within a corresponding reservoir at five-second intervals throughout the expired, five-minute payment period. In some aspects, service delivery module 110 may determine that the aggregated change in the amount of available fuel during the five-minute payment period, and thus, the amount of fuel consumed by the vehicle during the five-minute payment period, corresponds to 0.5 liters, and the based on the unit fuel cost of $1.50 per liter, service delivery module 110 may establish a micro-payment amount of $0.75 (e.g., a usage parameter) reflects the actual fuel consumed by the rental vehicle during the expired payment period.

Referring back to FIG. 1B, service delivery module 110 may, in some aspects, execute portions of the extracted elements of executable code, in conjunction with the payment-service cryptograms, which cause device 102 to perform operations that initiate a micro-payment transaction for the consumed fuel in the amount of $0.75. For example, in certain instances, service delivery module 110 may perform operations that generate a micro-payment request, e.g., request 116, which identifies the micro-payment amount, e.g., $0.75, and includes one or more portions of payment-service data 112, such as the payment-service cryptograms and/or authentication tokens that facilitate processing and back-end settlement of the initiated micro-payment transaction by settlement system 130, either alone or in conjunction with one or more of third-party computing system 160. Device 102 may transmit micro-payment request 116 to settlement system 130 across network 152 using any of the processes described above.

In some aspects, illustrated in FIG. 1B, settlement system 130 may receive micro-payment request 116, and a settlement module 142 may perform operations that process the micro-payment request 116, identify the corresponding micro-payment amount of $0.75, and extract portions of the payment-service data, such as the payment-service cryptograms. The payment-service cryptograms may, when decoded and accessed by settlement system 130, include instructions for settling the initiated micro-payment transactions, which include, but are not limited to, instructions to fund the micro-payment transactions by transferring funds associated with one or more source accounts held by user 170 at, or issued to user 170 by, a corresponding financial institution to accounts associated with the vehicle-rental company.

Settlement module 142 may, in certain aspects, perform operations that settle the initiated micro-payment transaction in accordance with the payment-service cryptograms and other payment-service data, either alone or in conjunction with one or more of third-party computing systems 160 (e.g., which may be associated with the financial institution that holds or issues user 170's financial services accounts and/or the vehicle-rental company). Further, in certain aspects, settlement module 142 rely on the prior authentication of user 170, and authentication token 137, when performing the one or more operations to settle the initiated micro-payment transaction, and any subsequent micro-payment transactions initiated by device 102.

Upon successful settlement of the initiated micro-payment transaction, settlement module 142 may generate data indicative of the settlement, e.g., data 144, which may be stored within a portion of settled payment data 134C of data repository 134. Data 144 may include, for example, data that identifying the micro-payment amount, e.g., $0.75, a time and date of micro-payment initiation and/or settlement, parties to the settled micro-payment, e.g., user 170 and the vehicle-rental company, and additionally or alternatively, data indicative of the financial-services transaction associated with the micro-payment, e.g., the transfer of funds from an account of user 170 to an account of the vehicle-rental company.

In certain aspects, sensor 103 may continue to detect the available fuel level at each of the corresponding monitoring periods, and generate additional sensor data, e.g., sensor data 107, which data aggregation module 108 may process and store within corresponding portions of sensor output data 104C. Using any of the exemplary processes described above, service delivery module 110 may detect an expiration of a successive payment period, and in response to the detected expiration, perform operations that initiate successive micro-payment transactions reflecting an actual cost of the fuel consumed by the vehicle during that successive payment period. In some aspects, by continuously monitoring the fuel consumed by the vehicle during operation by user 170 and by automatically initiating successive micro-payment transactions that reflect an actual amount of fuel consumed by the vehicle during corresponding payment periods, the disclosed embodiments may establish usage parameters indicative of an actual usage of the vehicle (e.g., the actual wear-and-tear) during each of the payment periods and further, allocate costs to user 170 that reflect the actual wear-and-tear of the vehicle in real time and concurrently with that usage.

Further, by relying on the prior authentication of user 170 to settle each of the successive micro-payment transactions initiated by device 102, the disclosed embodiments may reduce a computational load (e.g., on settlement system 130) and a network traffic (e.g., on network 152) associated with each of the micro-payment settlement processes initiated by settlement system 130. The reduction in the computation load imposed on settlement system 130, coupled with the reduction in network traffic (and resulting increase in network bandwidth), may enable settlement system 130 to settle each of the micro-payment transactions initiated by device 102 in real-time.

In certain embodiments described above, device 102 may be incorporated into a vehicle, such as a vehicle rented by user 170, and may include sensor 103 configured to detect and capture data indicative of an available fuel level at corresponding monitoring periods. The disclosed embodiments are, however, not limited these exemplary fuel-level sensors, and in further embodiments, sensor 103 may include any additional or alternate sensor type appropriate for inclusion within device 103 and capable of monitoring operational characteristics of the vehicle. For example, sensor types consistent with the disclosed embodiments may include, but are not limited to, sensors configured to monitor a working speed of the vehicle's engine (e.g., in RPM), sensors configured to monitoring an activity of the vehicle's transmission (e.g., to record a number of shifting operations), sensors configured to monitor a braking activity of the vehicle (e.g., an amount of available brake pad or a number of activations of an available anti-lock braking system (ABS)), sensors configured monitor the vehicle's odometer reading, and/or sensors configured to monitor variations in the vehicle's speed.

Additionally, although described in terms of a single sensor, e.g., sensor 103, the disclosed embodiments are not limited to devices that include only a single on-board sensor. In additional embodiments, device 102 may include a plurality of individual sensors, each of which may be configured to monitor an operational parameter associated with that rental vehicle. For example, device 102 may include sensor 103, which as described above, may be configured to monitor and capture sensor data 107 that indicate of a level of available fuel within a corresponding reservoir at each of the corresponding monitoring periods. In some instances, device 102 may also include one or more additional sensors that monitor and capture data indicative of corresponding operations parameters of the rental vehicle at each of the monitoring periods, such as an odometer value captured at each of the monitoring periods, a number of detected shifting operations during each of the monitoring periods, and/or values indicative of wear-and-tear on the vehicle's braking system during each of the monitoring periods.

In some instances, and as described above, data aggregation module 108 of device 102 may perform operations that store the time-varying sensor data captured by sensor 103 and the one or more additional sensors within sensor output data 104C of data repository 104, along with additional data that uniquely identifies each of the sensors, e.g., a device serial number, etc. Further, service delivery module 110 may perform any of the exemplary processes described above to establish, for each captured portion of the time-varying sensor data, a usage parameter, such as a micro-payment amount, that reflects a change in the values of the corresponding monitored parameter during the expired payment period, and initiate a corresponding micro-payment transaction for processing and settlement by settlement system 130, either alone or in conjunction with one or more of third-party computing systems 160.

In other aspects, service delivery module 110 may perform operations that aggregate the micro-payment amounts established for each of the captured portions of the time-varying sensor data, and initiate a single micro-payment transaction for the aggregated micro-payment amount, which may be processed and settled by settlement system 130 using any of the exemplary processes described above. By initiating a single micro-payment transaction representing of the changes in all (or at least a subset) of the monitored parameters of the rental vehicle during the expired payment period, the disclosed embodiments may determine and impose on user 170 costs that reflect the actual wear-and-tear experienced by the rental vehicle during the expired payment period, while reducing a computational load imposed on settlement system 130 and increasing a speed at which settlement system 130 processes and settles the initiated micro-payment transaction.

In other aspects, and in addition to the on-board sensors described above (e.g., sensor 103), device 102 may receive additional sensor data captured by one or more external sensor devices (e.g., an "array" of sensor devices) in communication with device 102 across a corresponding wired or wireless network, which may include, but is not limited to, a wireless LAN, e.g., a "Wi-Fi" network, a network utilizing radio-frequency (RF) communications protocols, a NFC network, a MAN connecting multiple wireless LANs, and a WAN, e.g., the Internet. Using any of the exemplary processes described above, device 102 may perform operations that receive and store portions of the additional sensor data in a data repository (e.g., within sensor output data 104C of data repository 104) at corresponding monitoring periods, and may initiate one or more micro-payment transactions that reflect costs associated with portions of the additional sensor data received during successive payment periods.

For example, the external sensor devices may include one or more RFID sensor devices capable of detecting RFID data and signals transmitted by device 102 (e.g., through a corresponding communications module using various RF communications protocols) and transmitting, to device 102, additional sensor data that indicates the detected proximity of device 102 to the RFID sensor device. In certain instances, a first RFID sensor device may be disposed at entrance of a high-occupancy-toll (HOT) roadway or other region having limited or restricted access, and the external sensor data may establish the presence of device 102 (and/or the rental vehicle) within the HOT roadway at a corresponding detection time, and further, identify the HOT roadway and the corresponding detection time.

As described above, data aggregation module 108 may perform operations that store portions of the external sensor data within sensor output data 104C, and service delivery module 110 may access one or more structured data records of service data 104A and extract tariff data that identifies the corresponding toll associated with the HOT roadway. For example, and based on the extracted tariff data, service delivery module 110 may determine that the presence of device 102 and/or the rental vehicle within the HOT roadway imposes a toll of $1.00 on user 170. In certain aspects, service delivery module 110 may perform any of the exemplary processes described above to initiate an additional micro-payment transaction to collect the imposed $1.00 toll, which may be settled by settlement system 130, either alone or in conjunction with third-party computing systems 160.

Further, one or more additional RFID sensor devices may be disposed at various tolling positions along the HOT roadway to establish the presence of device 102 and/or the rental vehicle at these tolling positions, which the extracted tariff data may associate with additional imposed tolls, e.g., an additional $0.50 toll per tolling position. In some aspects, device 102 may receive portions of external sensor data from successive ones of these additional RFID sensors these additional RFID sensors detect the presence of device 102 at corresponding ones of the tolling positions, and using any of the exemplary processes described above, device 102 may perform operations that initiate successive micro-payment transactions reflect the additional imposed tolls associated with each of the successive tolling positions, which may be processed for settlement by settlement system 130 and/or one or more of third-party computing system 160.

In certain aspects, by initiating and settle micro-payment transactions reflecting both changes in parameter values monitored by on-board sensor 103 during expired payment periods and external costs imposed on user 170 due to the operation of the rental vehicle during the expired payment periods (e.g., based on sensor data captured by the one or more external sensors), the disclosed embodiments may impose costs on user 170 that reflect the actual wear-and-tear imposed on the rental vehicle by user 170 and the and the external costs resulting from user 101's operation of the vehicle.

The disclosed embodiments are, however, not limited to these examples of external sensor devices, external sensor data, and corresponding initiated micro-payment transactions. In other aspects, device 102 may receive external sensor data from any additional or alternate external sensor or sensor device appropriate to device 102, a system or apparatus that includes device 102 (e.g., the rental vehicle), and/or the extracted tariff data, and may initiate any additional or alternate micro-payment transaction to reflect costs associated with portions of the received external sensor data. For example, external sensor devices consistent with the disclosed embodiments may include, but are not limited to, sensors devices capable of detecting a speed, position, acceleration, and/or temperature of device 102 and/or the rental vehicle, devices capable of capturing digital images of the rental vehicle (e.g., a speed camera operated by a law-enforcement agency), and sensor devices capable of determine a chemical composition of an exhaust of the rental vehicle.

Further, in certain embodiments described above, the rental vehicle may incorporate a single device, e.g., device 102, configured to initiate micro-payment transactions indicative of changes in parameter values monitored by one or more sensors during corresponding payment periods. In other aspects, and consistent with the disclosed embodiments, a plurality of individual devices may be incorporated into the rental vehicle (such as device 102, as described above), and each of the incorporated devices may include a sensor configured to monitor and capture sensor data indicative of a corresponding one of the parameters that characterize an operation of the rental vehicle and/or resources consumed by that rental vehicle.

Figure 2:
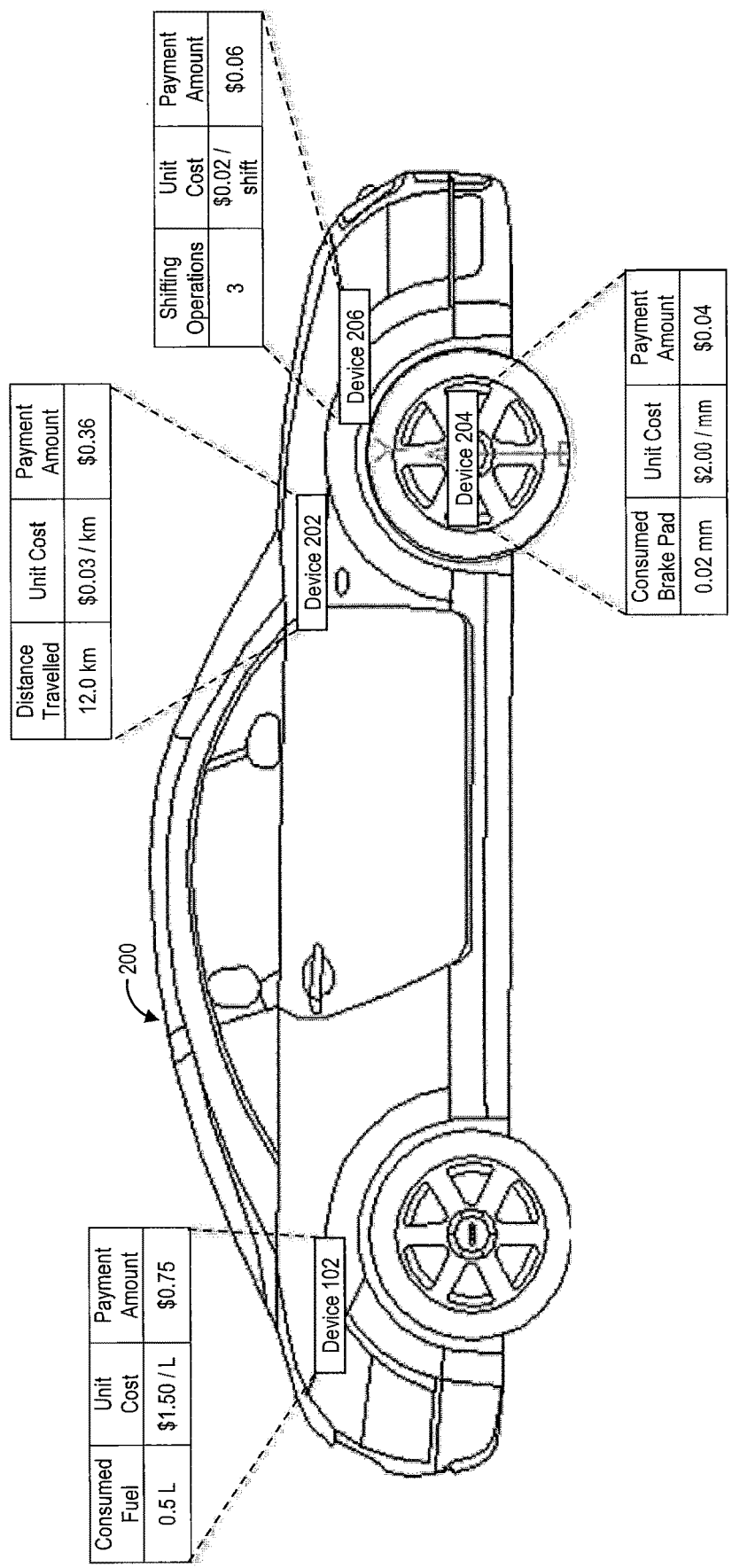
FIG. 2 is an additional diagram illustrating portions of an exemplary computing environment, consistent with the disclosed embodiments.

For example, as illustrated in FIG. 2, rental vehicle 200 may incorporate device 102, which as described above, may include a sensor (e.g., sensor 103) configured to monitor and capture data indicative of an available fuel level, and which may perform operations consistent with a provisioned payment service to initiate micro-payment transactions reflecting the actual, real-time consumption of liquid fuel by the vehicle during successive payment periods. In additional aspects, illustrated in FIG. 2, vehicle 200 may also include a plurality of additional devices, e.g., devices 202, 204, and 206, which may include components similar to those described above in reference to device 102. In some aspects, devices 202, 204, and 206 may include corresponding sensors configured to monitor and capture data indicative of values of corresponding parameters and/or resources consumed by vehicle 200. Further, devices 202, 204, and 206 may perform operations (e.g., consistent with the payment service described above) that initiate micro-payment transactions reflecting costs associated with changes in values of corresponding ones of the monitored parameters during the successive payment periods.

By way of example, and as described above, device 102 may include a fuel-level sensor configured to capture sensor data (e.g., sensor data 107) that reflects a level of fuel available to vehicle 200 at corresponding monitoring periods (e.g., every five seconds, etc.), and data aggregation module 108 may process and store sensor data 107 within corresponding portions of data repository 104, e.g., sensor output data 104C. Further, in one instance, device 202 may include an additional sensor, e.g., a mileage sensor, configured to communicate with an odometer of vehicle 200 and capture data indicative of odometer reading of vehicle 200 at each of the corresponding monitoring periods. Additionally, in some instances, device 204 may include a brake-wear sensor configured to detect a thickness of a brake pad within a braking assembly of at least one wheel of vehicle 200 (e.g., a front-passenger-side braking assembly of vehicle 200) at each of the corresponding monitoring periods, and device 206 may include a shift sensor coupled to an electronic or manual transmission of vehicle 200 and configured to capture data indicative of a number of shifting operations performed during each of the corresponding monitoring periods.

The disclosed embodiments are, however, not limited to these exemplary sensor types, and in further embodiments, devices 202, 204, and 206 may include any additional or alternate type of sensor that would appropriate to devices 202, 204, and 206 and further, capable of monitoring parameters of and/or resources consumed by vehicle 200. Additionally, although described in terms of vehicle 200 that includes four devices (e.g., device 102, 202, 204, and 206), the disclosed embodiments are not limited to these exemplary number of devices, and in other aspects, vehicle 200 may include any additional or alternate number of device (e.g., structured similarly to device 102) that would be appropriate to vehicle 200 and capable of monitoring the operation of vehicle 200.

As described above, each of device 202, 204, and 206 may include a data aggregation module (e.g., similar to data aggregation module 108 of device 102), which may process and store the captured sensor data within corresponding data repositories, e.g., as maintained by device 202, 204, and 206 within corresponding tangible, non-transitory memories. Further, and using any of the exemplary processes described above, each of device 202, 204, and 206 may register onto communications network 152 and may transmit, to settlement system 130 across network 152, data requesting the provisioning of one or more available services, such as the payment service described above. For example, in response to the transmitted requests, settlement system 130 may perform operations that transmit, to devices 202, 204, and 206, elements of executable code, payment-service related cryptograms, authentication tokens, and/or tariff data that enable devices 202, 204, and 206 to perform operations that initiate periodic micro-payment transactions reflecting the changes in the monitored parameter values and/or consumed vehicle-based resources. In certain instances, devices 202, 204, and 206 may receive the elements of executable code, payment-service related cryptograms, authentication tokens, and/or tariff data from settlement system 130, and devices 202, 204, and 206 store the received data within a corresponding data repository maintained in one or more tangible, non-transitory memories, which may provision devices 202, 204, and 206 with the payment service.

In certain aspects, device 102 and further, devices 202, 204, and 206, may perform operations consistent with the provisioned payment service to monitor and capture data indicative of values of corresponding parameters of and/or resources consumed by vehicle 200 at successive monitoring periods and, upon detection of an expiration of a payment period, initiate corresponding micro-payment transactions to account for changes in the monitored values during the expired payment period. For example, and as described above, service delivery module 110 may establish that vehicle 200 consumed 0.5 liters of fuel during an expired, five-minute payment period, and based on portions of the tariff data specifying a unit fuel cost of $1.50 per liter, service delivery module 110 may establish that a micro-payment amount of $0.75 reflects the actual fuel consumed by the rental vehicle during the expired payment period. Using any of the exemplary processes described above, service delivery module 110 may initiate a micro-payment transaction in the established micropayment amount, e.g., $0.75, which settlement system 130 may settle, either alone or in conjunction with one or more of third-party computing system 160.

Further, in some instances, the mileage sensor included within device 202 may capture data indicative of a current mileage of vehicle 200 at successive, five-second monitoring periods, and the data aggregation module of device 202 (not shown in FIG. 2) may store the captured mileage data within the corresponding data repository, e.g., as maintained by device 202 in the one or more tangible, non-transitory memories. As described above, and upon detection of the expired, five-minute payment period, a service delivery module of device 202 (not shown in FIG. 2) may extract, from the corresponding data repository, the sixty data records indicative of the vehicle mileage captured during the expired, five-minute payment period and portions of the stored tariff data indicative of an assigned cost per unit mileage unit.

Based on the extracted data records, device 202 may determine a change in the mileage of vehicle 200 during the expired, five-minute payment period. For example, the service delivery module of device 202 may determine that vehicle 200 travelled 12.0 kilometers during the expired, five-minute payment period, and based on the extracted tariff data, may establish a unit mileage cost of $0.03 per kilometer. In some aspects, and using any of the exemplary processes described above, the service delivery module of device 202 may determine that a micro-payment amount of $0.36 accounts for the distance travelled by vehicle 200 during the expired, five-minute payment period, and may perform operations that initiate a micro-payment transaction in the amount of $0.36 to account for the travelled distance of 12.0 kilometers, e.g., by transmitting a request for the $0.36 micro-payment transaction to settlement system 130, which may process the request and settle the $0.36 micro-payment.

Additionally, in some instances, the brake-wear sensor included within device 204 may capture data indicative of a current brake-pad thickness within the front-passenger-side braking assembly of vehicle 200 at monitoring periods of five seconds, and the data aggregation module of device 204 (not shown in FIG. 2) may store the captured brake-wear data within the corresponding data repository, e.g., as maintained by device 204 in the one or more tangible, non-transitory memories. As described above, and upon detection of the expired, five-minute payment period, a service delivery module of device 204 (not shown in FIG. 2) may extract, from the corresponding data repository, the sixty data records indicative of the brake-pad thickness captured during the expired, five-minute payment period and portions of the stored tariff data indicative of an assigned cost per unit of brake-pad thickness.

Based on the extracted data records, device 204 may determine a change in the brake-pad thickness of the front-passenger-side braking assembly during the expired, five-minute payment period. For example, the service delivery module of device 204 may determine that the detected brake-pad thickness decreased by 0.02 millimeters during the expired, five-minute payment period, and based on the extracted tariff data, may establish a cost per unit brake-pad thickness of $2.00 per millimeter. In some aspects, and using any of the exemplary processes described above, the service delivery module of device 204 may determine that a micro-payment amount of $0.04 accounts for the brake-pad thickness consumed during the expired, five-minute payment period, and may perform operations that initiate a micro-payment transaction in the amount of $0.04 to account for the change of 0.02 millimeters in brake-pad thickness, e.g., by transmitting a request for the $0.04 micro-payment transaction to settlement system 130, which may process the request and settle the $0.04 micropayment.

In further instances, the shift sensor included within device 206 may capture data indicative of a total number of detected shifting operations initiated by an electronic or manual transmission of vehicle 200 at the successive, five-second monitoring periods, and the data aggregation module of device 206 (not shown in FIG. 2) may store the captured shifting data within the corresponding data repository, e.g., as maintained by device 206 in the one or more tangible, non-transitory memories. As described above, and upon detection of the expired, five-minute payment period, a service delivery module of device 206 (not shown in FIG. 2) may extract, from the corresponding data repository, the sixty data records indicative of the total number of shifting operations detected during the expired, five-minute payment period and portions of the stored tariff data indicative of an assigned cost per detected shifting operation.

Based on the extracted data records, device 206 may determine a change in the number of detected shifting operations during the expired, five-minute payment period. For example, the service delivery module of device 206 may determine that the electronic transmission of vehicle 200 initiated three shifting operations during the expired, five-minute payment period, and based on the extracted tariff data, may establish a cost of $0.02 per detected shifting operation. In some aspects, and using any of the exemplary processes described above, the service delivery module may determine that a micro-payment amount of $0.06 accounts for the number of shifting operations initiated by the electronic transmission of vehicle 200 during the expired, five-minute payment period, and may perform operations that initiate a micro-payment transaction in the amount of $0.06 to account for the three detected shifting operations, e.g., by transmitting a request for the $0.06 micro-payment transaction to settlement system 130, which may process the request and settle the $0.06 micropayment.

In certain aspects, the sensors included within devices 102, 202, 204, and 206 may continue to detect, respectively, the consumed fuel, distance travelled, consumed brake-pad thickness, and initiated shifting operations of vehicle 200 at the corresponding monitoring periods, and generate additional sensor data, which corresponding ones of the data aggregation modules may process and store within corresponding portions of the maintained data repositories, as described above. Further, and using any of the exemplary processes described above, service delivery modules of devices 102, 202, 204, and 206 may detect an expiration of a successive payment period, and in response to the detected expiration, perform operations that initiate successive micro-payment transactions reflecting costs for consumed fuel, distance travelled, consumed brake-pad thickness, and initiated shifting operations respectively detected by the corresponding sensors.

In some aspects, by continuously monitoring the consumed fuel, distance travelled, consumed brake-pad thickness, and initiated shifting operations resulting from user 170's operation of vehicle 200 during the rental period, and by automatically initiating successive micro-payment transactions that reflect changes in the actual values of these monitored vehicle parameters during corresponding payment periods, the disclosed embodiments may establish usage parameters indicative of an actual usage of the vehicle during each of the payment periods, and further, the actual wear-and-tear imposed on vehicle 200 by user 170's operation of vehicle 200. Further, through the incorporation of an array of devices into vehicle 200, and thus, an array of sensors capable of monitoring and capturing various operation parameters of vehicle 200, the disclosed embodiments may allocate costs that accurate reflect the actual wear-and-tear to user 170 in real time and concurrently with user 170's operation of the vehicle.

In certain embodiments, as described above, device 102 (and similarly structured devices 202, 204, and 206) may be incorporated within a vehicle operated by user 170, e.g., vehicle 200, and may include on-board sensors configured to capture data indicative of time-varying values of corresponding vehicle parameters, such as available fuel level, brake-pad thickness, initiated shifting operations, and/or vehicle mileage. The disclosed embodiments are, however, not limited to these examples of vehicle-based devices, and in other embodiments, device 102 may be incorporated into any additional or alternate system or apparatus operated by, owned by, and/or associated with user 170.

For example, device 102 may be incorporated into one or more tools, such as electric nail gun, which user 170 may rent from a corresponding business entity (e.g., which maintains one of third-party computing systems 160) and operate during a corresponding rental period. For example, device 102 may include an on-board sensor, e.g., sensor 103, configured to detect a quantity of one or more resources consumed by the pneumatic nail gun at corresponding monitoring periods during operation by user 170. These consumed resources may include, but are not limited to, a number of nails consumed by the electric nail gun during each of the monitoring periods and/or an amount of electrical energy consumed by the electric nail gun during each of the monitoring periods.

For instance, the electric nail gun may be loaded with a quantity of nails, and sensor 103 may be configured to monitor and capture data indicative of the quantity of available nails during each of the monitoring periods. As described above, data aggregation module 108 of device 102 may store the captured sensor data within a corresponding portion of data repository 104 (e.g., within sensor output data 104C), along with data that uniquely identifies sensor 103, such as a sensor serial number, and time stamps associated with each element of stored sensor data. As described above, and upon detection of the expiration of the five-minute payment period, service delivery module 110 of device 102 may extract, from data repository 104, the sixty data records indicative of the number of remaining nails at each of the monitoring periods, and may perform operations that establish a total quantity of nails consumed through the operation of the electric nail gun during the expired, five-minute payment period. Additionally, and as described above, service delivery module 110 may obtain, from service data 104A of data repository 104, portions of the stored tariff data indicative of a cost assigned to each nail consumed during the expired, five-minute payment period.

For example, service delivery module 110 may establish that the electric nail gun consumed twenty-three nails during the expired, five-minute payment period, and based on the extracted tariff data, may establish a cost of $0.05 per consumed nail. In some aspects, and using any of the exemplary processes described above, service delivery module 110 may determine a micro-payment amount of $1.15, which reflects an actual cost associated with user 170's operation of the electric nail gun during the expired, five-minute payment period, and may perform operations that initiate a micro-payment transaction in the amount of $1.15, e.g., by transmitting a request for the $1.15 micro-payment transaction to settlement system 130, which may process the request and settle the $1.15 micropayment.

In other examples, device 102 may be incorporated into a wireless router and may be configured to monitor a consumption of various computational and/or networking resources, such as quantity of digital data consumed by one or more communications devices associated with user 170. For example, device 102 may include an on-board sensor, e.g., sensor 103, configured to detect a quantity of digital data (e.g., streaming video, etc.) received by the wireless router and consumed by various communications devices connected to the wireless router during corresponding monitoring periods. As described above, data aggregation module 108 of device 102 may store the captured sensor data within a corresponding portion of data repository 104 (e.g., within sensor output data 104C), along with data that uniquely identifies sensor 103, such as a sensor serial number, and time stamps associated with each element of stored sensor data.

Further, and upon detection of the expiration of the five-minute payment period, service delivery module 110 of device 102 may extract, from data repository 104, sixty data records indicative of the quantity of digital data received by the wireless router during each of the monitoring periods, and may perform operations that establish a total quantity of digital data received by the wireless router, and thus, consumed by various communications devices connected to the wireless router, during the expired, five-minute payment period. Additionally, and as described above, service delivery module 110 may obtain, from service data 104A of data repository 104, portions of the stored tariff data indicative of a cost assigned to each unit of consumed digital data during the expired, five-minute payment period.

For example, service delivery module 110 may establish that the wireless router received 102 MB of digital data during the expired, five-minute payment period, and based on the extracted tariff data, may establish a cost of $0.005 per megabyte of received digital data. In some aspects, and using any of the exemplary processes described above, service delivery module 110 may determine a micro-payment amount of $0.51, which reflects an actual cost associated with the digital data received by the wireless router, and thus consumed by user 170's communications devices, during the expired, five-minute payment period, and may perform operations that initiate a micro-payment transaction in the amount of $0.51, e.g., by transmitting a request for the $0.51 micro-payment transaction to settlement system 130, which may process the request and settle the $0.51 micro-payment.

In certain aspects, as described above, device 102 may be configured to store sensor data (e.g., sensor data 107) captured by one or more sensors (e.g., sensor 103 and/other on-board sensors) and additionally or alternatively, by one or more external sensors in communication with device 102, within corresponding portions of a data repository maintained in one or more tangible, non-transitory memories (e.g., within sensor output data 104C of data repository 104). In further aspects, as described below, the disclosed embodiments may be configured to record the captured sensor data (e.g., as captured by sensor 103, the one or more on-board sensors, and/or the one or more external sensors) within one or more blocks of a block-chain ledger, which may be generated and maintained by one or more peer computing systems (not depicted in FIG. 1A, 1B, or 2). In certain aspects, described below, device 102, settlement system 130, and any additional or alternate component of computing environment 130 may obtain the updated versions of the generated and maintained block-chain ledger, extract portions of the recorded sensor data, and based on the extracted sensor data, perform any of the exemplary processes described herein to initiate and settle periodic micro-payment transactions reflecting a real-time consumption or usage of various resources.

For example, device 102 may be associated with a corresponding user, e.g., user 170, and data aggregation module 108 of device 102 may receive and aggregate sensor data captured by sensor 102 and additionally or alternatively, by other on-board or external sensors. As described above, data aggregation module 108 may perform operations that generate a data package including portions of the captured sensor data, time stamps associated with each element of the captured sensor data, and further, a unique identifier that associates a corresponding on-board or external sensor with each element of the captured sensor data. In certain aspects, data aggregation module 108 may input the generate data package to a block-chain module of device 102 (not depicted in FIGS. 1A, 1B, and 2), which may access a private cryptographic key associated with user 170 and using the private cryptographic key, apply a digital signature of user 170 to the generated data package. In some aspects, the block-chain module may perform operations that transmit the generated data package (e.g., in unencrypted form or encrypted using any appropriate encryption scheme) and the applied digital signature to a peer computing system across a corresponding communications network, e.g., network 152.

In certain aspects, the peer computing system (not depicted in FIG. 1A, 1B, or 2) may be configured (e.g., by elements of code or other software instructions executed by a corresponding processor) to receive the data package and digital signature, validate the received information, and further, generate a new block of the current block-chain ledger that includes the captured sensor data (e.g., data representative of the new block). For example, the peer computing system may validate the received data package and digital signature using a public key of user 170, and in response to a successful validation, generate a new block that includes the captured sensor data. The peer computing system may also generate one or more cryptographic hashes appropriate to and representative of the generated block, which the peer computing system may append to the current version of the block-chain ledger, thus generating an updated block-chain ledger. In some instances, the peer computing system may maintain data indicative of the updated block-chain ledger within a corresponding data repository (e.g., within one or more tangible non-transitory memories), and may provide the updated block-chain ledger to one or more devices (e.g., device 102, device 202, etc.) and/or systems (e.g., settlement system 130) operating within environment 100. Further, in some aspects, the peer computing system, and additionally or alternatively, one or more additional peer computing systems accessible across network 152, may function as a "miner" that validates received data and generates updated versions of the block-chain ledgers.

In some aspects, the one or more device and/or systems may receive data indicative of the updated block-chain ledger from the peer computing system across network 152, and may perform operations to verify and extract portions of the captured sensor data from the updated block-chain ledger. For example, one or more of devices 102, 202, 204, or 206 may extract captured sensor data representative of a monitored consumption of device-specific resources (or resources associated with a system or apparatus into which these devices are incorporated) and perform any of the exemplary processes described herein to initiate a micro-payment transaction that reflects a real-time consumption of these resources. In other instances, settlement system 130 may extract portions of the captured sensor data from the updated block-chain ledger, and based on portions of the captured sensor data, perform operations that initiate and settle one or more micro-payment transactions that reflect a real-time consumption of the device-specific resources.

Further, and as described above, one or more devices (e.g., device 102)_may be incorporated within a vehicle rented by user 170 over a particular rental period, e.g., a rental period of one hour. For instance, device 102 may include sensor 103, which may be configured to monitor a level of fuel available to the vehicle at discrete monitoring intervals, and based on tariff data provisioned to device 102 by settlement system 130, initiate periodic micro-payment transactions that reflect an actual cost of the vehicle's real-time, instantaneous fuel consumption.

In some aspects, the tariff data may form a portion of a rental contract established between user 170 and a vehicle-rental company. The rental contract may, in some instances, specify the rental period (e.g., one hour), the tariff data establishing the unit cost of consumed fuel (e.g., $1.50 per liter of consumed fuel), and information identifying one or more financial terms, such as a source account of user 170 that funds rental costs (including the exemplary micro-payment transaction) and an account of the vehicle-rental company that receives the rental costs. In one instance, the contract may be a written agreement, which user 170 may execute prior to picking up the rental vehicle. In other instances, and consistent with the disclosed embodiments, the rental contract may corresponding to a digital or electronic contract (e.g., an "e-contract"), the terms of which a computing system associated with the vehicle-rental company (e.g., one or more of third-party computing systems 160) may transmit to the peer computing system for inclusion within a new block of a block-chain ledger.

For example, and as described, a block-chain module of the vehicle-rental-agency computer system may receive data indicative of the terms of the rental contract (e.g., the tariff data establishing the unit cost of the consumed fuel), and may perform operations that apply a corresponding digital signature to the rental-contract data using any of the exemplary processes described above. In some aspects, the block-chain module of the vehicle-rental-agency computer system may transmit the rental-contract data and the applied digital signature to the peer computing system, which may generate a new block that includes the rental-contract data, generate one or more cryptographic hashes appropriate to and representative of the new block, and append the new block to the current version of the block-chain ledger using any of the processes described above. In some instances, the peer computing system may maintain data indicative of an updated block-chain ledger within a corresponding data repository (e.g., within one or more tangible non-transitory memories), and may provide the updated block-chain ledger to one or more devices (e.g., device 102, device 202, etc.) and/or systems (e.g., settlement system 130) within environment 100. In certain aspects, by incorporating portions of the tariff data into block-chain ledgers maintained and distributed by the peer computing system, the disclosed embodiments may enable the vehicle-rental-agency computing system to push updates to the tariff data to all affected parties through a single transmission of updated data to the peer computing system.

In one aspect, device 102 may receive the updated block-chain ledger, and perform any of the exemplary processes described herein to extract portions of tariff data from the updated block-chain ledger (e.g., the unit cost of $1.50 per liter of consumed fuel), obtain portions of the captured sensor data indicative of the real-time consumption of fuel by the vehicle (e.g., the consumed 0.5 L of fuel from sensor data 107), and initiate a micro-payment transaction in the amount of $0.75, which reflects the actual fuel consumption of the vehicle. For example, as described above, device 102 may generate, and transmit to settlement system 130, a micro-payment request that identifies the micro-payment amount, e.g., $0.75, and includes payment-service data, such as the payment-service cryptograms and/or authentication tokens that facilitate processing and back-end settlement of the initiated micro-payment transaction by settlement system 130, either alone or in conjunction with one or more of third-party computing system 160.

In other instances, settlement system 130 may receive the transmitted micro-payment request, and further, may obtain the updated block-chain ledger that includes, among other things, rental-contract data identifying the one or more financial terms of the agreement, such as the source account of user 170 that funds the initiated micro-payment transaction and the account of the vehicle-rental company that receives the proceeds of the micro-payment transaction. Settlement system 130 may extract the financial terms from the updated block-chain ledger, and may perform any of the exemplary processes described herein to settle the initiated micro-payment transaction in accordance with the corresponding payment-service data (e.g., the payment-service cryptograms, authentication tokens, and other payment-service data) and the financial terms obtained from the updated block-chain ledger, either alone or in conjunction with one or more of third-party computing systems 160. In some aspects, settlement system 130 may be configured to ensure each party's performance of the terms of the digital or electronic contract for the rental of the vehicle, and further, to settle one or more periodic micro-payment transactions in accordance with the terms of that digital or electronic contract. Further, upon settlement of the initiated micro-payment transaction, and any additional or alternate micro-payment transaction, settlement system 130 may perform additional operations that transmit data indicative of the settlement micro-payment transaction or transactions, along with applied digital signatures, to the peer computing system for inclusion in a new block of the block-chain ledger, as described above.

Figure 3:
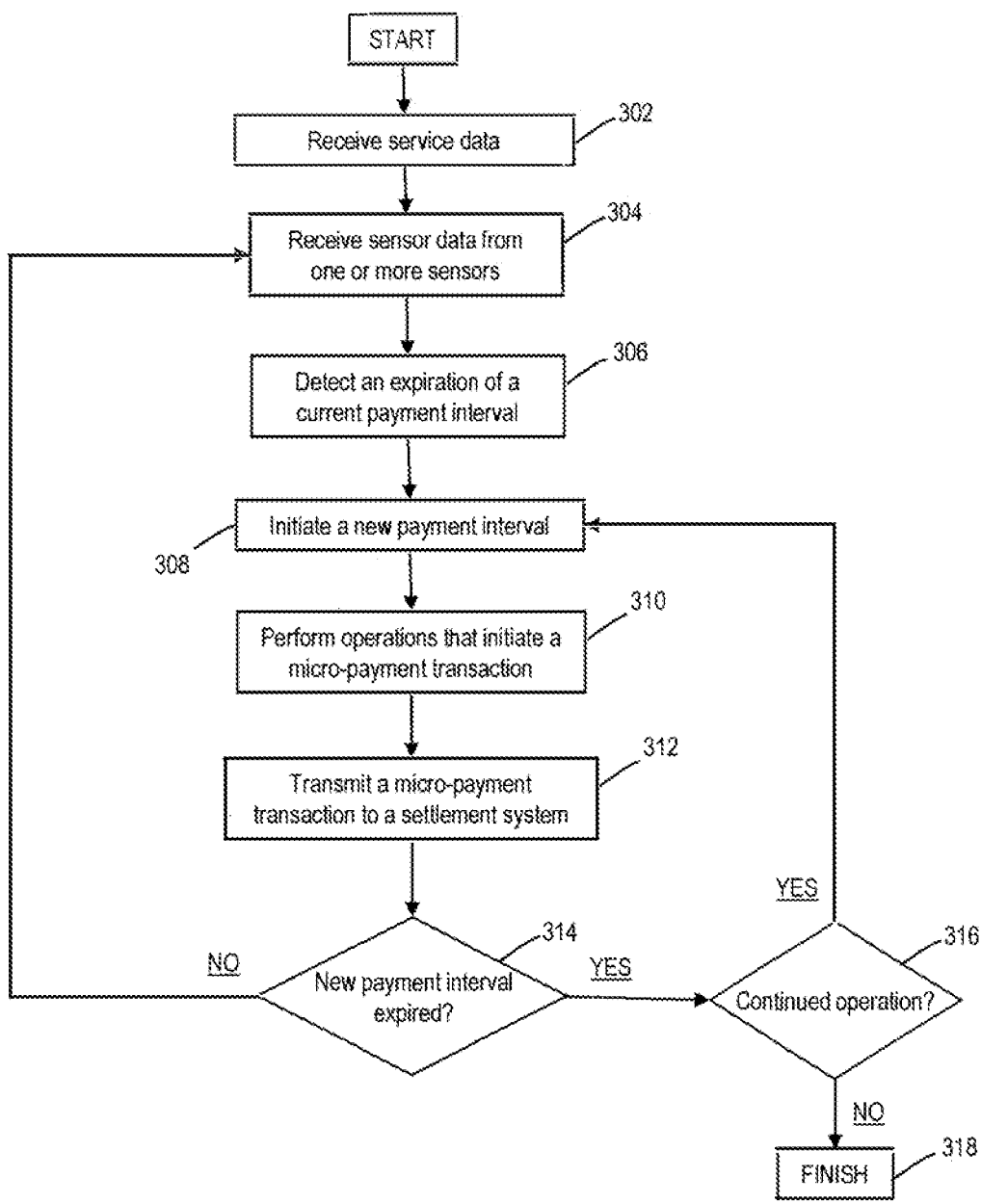
FIG. 3 is a flowchart of an exemplary process for automatically performing operations in accordance with captured sensor data, consistent with disclosed embodiments.

FIG. 3 is a flowchart of an example process 300 for automatically performing operations consistent with one or more provisioned services based on sensor data captured by one or more on-board sensors or external sensor devices, in accordance with the disclosed embodiments. In some aspects, a device, e.g., device 102 of FIG. 1, may perform the steps of example process 300. For example, and as described above, device 102 may perform operations that register device 102 onto a corresponding network, e.g., network 152, and request from a corresponding settlement system, e.g., settlement system 130, data that provisions device 102 with one or more available services, which include, but are not limited to, a payment service that enables device 102 to initiate micro-payment transactions reflecting costs associated with changes in parameter values monitored by the one or more on-board or external sensor devices during successive payment periods. These performed operations may, in certain instances, accurately characterize an actual consumption of a particular resource (e.g., an actual usage of device 102 and additionally or alternatively, an apparatus or system that includes device 102, such as a vehicle, a network router, etc.) during each of the successive, temporal payment periods, and further, impose costs on a user associated with device 102, e.g., user 170, that reflect the determined, real-time consumption of the particular resource.

Referring to FIG. 3, device 102 may receive provisioning data (e.g., a provisioning package) from settlement system 130 that identifies one or more available services and includes service data that enables device 102 to perform operations consistent with the one or more available services (e.g., in step 302). In certain aspects, and as described above, settlement system 130 may receive the request for available services from device 102 (e.g., a provisioning request), and upon a successful authentication of user 170, perform operations that obtain portions of the service data from a corresponding data repository (e.g., from service data 134D of data repository 134) and packaged the obtained service data into the provisioning package for delivery to device 102. Settlement system 130 may transmit the generated provisioning package to device 102 across network 152, and device 102 may receive the transmitted provisioning package in step 302.

For example, the one or more available services may include a payment service, and the provisioning package may include elements of executable code (e.g., executable application modules, etc.), payment-service cryptograms, authentication tokens, tariff data, and other payment-service data that enables device 102 to perform operations consistent with the available payment service. Device 102 may store portions of the received provisioning package within a data repository maintained within one or more tangible, non-transitory memories, which may provision device 102 with the available payment service and enable device 102 to automatically initiate periodic micro-payment transactions reflecting changes in parameter values monitored by corresponding on-board or external sensors during successive payment periods.

In some aspects, device 102 may receive sensor data indicative of values of one or more parameters of device 102, and additionally or alternatively, a system or apparatus into which device 102 is incorporated (e.g., the vehicle, network router, or pneumatic nail gun described above), at corresponding monitoring periods (e.g., in step 304). For example, and as described above, device 102 may be incorporated into a vehicle, and may include an on-board fuel-level sensor (e.g., sensor 103) configured to monitor and capture data (e.g., sensor data 107) indicative a level of fuel available to the vehicle at successive, five-second monitoring periods. Device 102 may, in certain instances, store portions of the captured sensor data within data repository 104 (e.g., within sensor output data 104C), along with a unique identifier of the fuel-level sensor, such as a sensor serial number, and time stamps of each element of the captured sensor data. The disclosed embodiments are, however, not limited to these examples of sensors and captured sensor data, and in other embodiments, device 102 may receive and store data captured by any additional or alternate on-board or external sensor (e.g., a brake-wear sensor, a mileage sensor, a shift sensor, a RFID sensor, a transmitted data sensor, etc.) configured to capture data indicative of one or more monitored parameter values at any additional or alternate monitoring period.

Referring back to FIG. 3, device 102 may identify a current payment period associated with the provisioned payment service and detect an expiration of the current payment period (e.g., in step 306). For example, device 102 may access portions of service data 1048 and extract data indicative of a starting time and a duration of the current payment period (e.g., a five-minute interval). Based on the extracted data, device 102 may determine in step 306 that a current time falls outside the five-minute interval of the starting time, and thus, detect the expiration of the current payment period. Further, and in response to the detected expiration, device 102 may initiate a new payment period, e.g., by storing data indicative of an updated starting time for the new payment period within service data 104B of data repository 104 (e.g., in step 308).

In further response to the identified expiration, device 102 may perform operations that initiate one or more micro-payment transactions that reflect a change in the parameter values monitored by the on-board or external sensors during the expired payment period (e.g., in step 310). In some aspects, device 102 may access data repository 104 (e.g., sensor output data 104C), and obtain data indicative of one or more parameter values captured by corresponding on-board or external sensors at discrete monitoring periods during the expired payment period. Using any of the exemplary processes described above, device 102 may establish a change in the values of each of the monitored parameter values, and based on portions of the stored tariff data, determine usage parameters, e.g., micro-payment amounts, that reflect actual costs associated with corresponding ones of the changes in the monitored parameter values.

By way of example, and as described above, device 102 may be incorporated into a vehicle operated by user 170, and may include an on-board, fuel-level sensor (e.g., sensor 103) configured to capture data indicative of an available fuel level at five-second monitoring periods, which device 102 may store within sensor output data 104C of data repository 104. In some aspects, in step 310, device 102 may access sensor output data 104C, and obtain a portion of the stored sensor data that corresponds to the available fuel amounts captured by sensor 103 during the expired, five-minute payment period. The obtained sensor data may, for example, include sixty discrete data records identifying the amount of fuel within a corresponding reservoir at five-second intervals throughout the expired, five-minute payment period, and device 102 may perform operations that compute a change in the detected fuel amount during the expired, five-minute payment period, and thus, an amount of fuel consumed by the vehicle throughout the expired, five-minute payment period.

Device 102 may also access the stored service data (e.g., service 104A of data repository 104), and may extract tariff data that identifies a unit cost of the consumed liquid fuel. For example, and based on the obtained sensor data, device 102 may establish that the vehicle consumed 0.5 liters of fuel during the expired, five-minute payment period, and may determine that the extracted tariff data specifies a unit cost of $1.50 per liter for the consumed fuel. Further, device 102 may determine that a micro-payment amount of $0.75 (e.g., the usage parameter) reflects the actual cost of the fuel consumed by the vehicle during the expired, five-minute payment period.

In some aspects, in step 310, device 102 may execute portions of the stored elements of executable code in conjunction with the payment-service cryptograms, authentication tokens, and/or other payment-service data, which causes device 102 to perform operations that initiate a micro-payment transaction reflecting the $0.75 cost of the consumed fuel during the expired, five-minute payment period. As described above, one or more block-chain ledgers, e.g., as received from the peer computing system described above, may incorporate portions of the sensor data (e.g., the 0.5 L of consumed fuel) and further, terms of a digital or electronic contract for the rental of the vehicle (e.g., which specifies portions of the tariff data, such as the $1.50 cost per liter of consumed fuel). Device 102 may, in some instances, extract the portions of the sensor data and/or the portions of the tariff data from the one or more block-chain ledgers, and may perform operations that initiate the micro-payment transaction based on the extracted portions of the sensor and/or tariff data.

By way of example, and using any of the exemplary processes described above, device 102 may generate a request that settlement system 130 process and settle the initiate micro-payment transaction that reflects the $0.75 actual cost of the fuel consumed by the vehicle during the expired, five-minute payment period. The generated request, e.g., a micro-payment request, may include data that identifies the micro-payment amount, e.g., $0.75, and additionally or alternatively, one or more portions of payment-service cryptograms, authentication tokens, and/or other payment-service data that facilitate processing and back-end settlement of the initiated micro-payment transaction by settlement system 130.

Referring back to FIG. 3, device 102 may transmit the generated micro-payment request to settlement system 130 across network 152 using any of the exemplary processes described above (e.g., in step 312). In certain aspects, settlement system 130 may receive the transmitted micro-payment request, and as described above, may process the received micro-payment request, identify the corresponding micro-payment amount of $0.75, and extract the payment-service cryptograms, authentication tokens, and/or other include payment-service data. Settlement system 130 may, in further aspects, perform any of the exemplary processes described above to settle the initiated micro-payment transactions in accordance with the payment-service cryptograms, authentication tokens, and other payment-service data, either alone or in conjunction with one or more of third-party computing systems 160 (e.g., which may be associated with the financial institution that holds or issues user 170's financial services accounts and/or the vehicle-rental company).

Further, and as described above, one or more block-chain ledgers, e.g., as maintained by the peer computing system described above, may incorporate terms of the digital or electronic contract for the rental of the vehicle, such as financial terms identifying a source account of user 170 that funds the initiated micro-payment transactions and an account of the vehicle-rental company that receives the proceeds of the micro-payment transactions. Settlement system 130 may obtain the financial terms from the one or more block-chain ledgers, and perform operations that settle initiated micro-payment transactions in accordance with the financial terms of the rental agreement. In other aspects, settlement system 130 may rely on the prior authentication of user 170, and the corresponding authentication token, when performing the one or more operations to settle the initiated micro-payment transaction, and any subsequent micro-payment transactions initiated by device 102.

In some aspects, upon transmission of the generated micro-payment transaction request to settlement system 130, device 102 may determine whether the new payment period (e.g., as established in step 308) has now expired (e.g., in step 314). For example, and as described above, device 102 may access portions of stored service data 104B to identify the updated start time of the new payment period (e.g., a five-minute payment period), and may determine in step 314 whether the current time falls within the five-minute interval of that updated start time.

If device 102 were to determine that the current time falls within the five-minute interval of the updated start time, and thus, that the new payment period remains unexpired (e.g., step 314; NO), exemplary process 300 may pass back to step 304, and in some aspects, device 102 may continue to receive sensor data captured by the one or more on-board or external sensors, as described above. If, however, device 102 were to determine that the current time falls outside the five-minute interval of the updated start time, and thus, that the new payment period is now expired (e.g., step 316; YES), device 102 may perform operations that determine whether user 170 continues to operate device 102, and additionally or alternatively, the system or apparatus that includes device 102, e.g., the vehicle, network router, or pneumatic nail gun described above (e.g., in step 316).

For example, and as described above, device 102 may be incorporated into a vehicle, and in step 316, device 102 may obtain data indicate of a continued operation of vehicle 200 by user 170. In some instances, device 102 may perform operations that access an on-board computing system maintained by vehicle 200 (e.g., through a corresponding programmatic interface, such as an application programming interface (API)), and access data indicative an operation state of vehicle 200, such as data indicative whether an engine of vehicle 200 is currently operating. In response to the accessed data, device 102 may determine whether user 170 continues to operate vehicle 200 (e.g., in step 316).

If device were to determine that device 102, and additionally or alternatively, the system or apparatus that includes device 102, remains operational (e.g., step 316; YES), exemplary process 300 may pass back to step 308. For example, and as described above, device 102 may perform operations that initiate a new payment period, e.g., by storing data indicative of an updated starting time for the new payment period within service data 104B of data repository 104 (e.g., in step 308), and that initiate one or more micro-payment transactions that reflect a change in the values of the corresponding operational parameters monitored by the on-board or external sensors during the newly-expired payment period (e.g., in step 310). If, however, device 102 were to determine that user 170 no only operates device 102, or the system or apparatus that includes device 102 (e.g., step 316; NO), then exemplary process 300 may be complete in step 318.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including device provisioning module 105, data aggregation module 108, service delivery module 110, other disclosed data aggregation modules and service delivery modules, authentication module 135, provisioning module 138, and settlement module 142, can be implemented as one or more computer programs, i.e., one or more modules of computer program instructions encoded on a tangible non-transitory program carrier for execution by, or to control the operation of, data processing apparatus. Additionally or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, such as an FPGA (field programmable gate array) or an ASIC (application-specific integrated circuit). The apparatus can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A device, comprising:
   a communications interface;
   a memory storing instructions; and
   at least one processor coupled to the communications interface and to the memory, the at least one processor being configured to execute the instructions to:
      obtain a value of a first device parameter detected by a first sensor during a temporal interval;

based on the value of the first device parameter, generate a usage parameter that characterizes an operation of the device during the temporal interval; and generate and transmit, to a computing system via the communications interface, a service request that includes the usage parameter and an authentication token associated with a service provisioned to the device, the service request causing the computing system to validate the authentication token, authenticate the device based on the validation, and perform one or more operations in accordance with the usage parameter, the one or more performed operations being consistent with the provisioned service, and the authentication token being indicative of a prior authentication of the device by the computing system.

2. The device of claim 1, wherein the at least one processor is further configured to execute the instructions to:

receive the authentication token from the computing system via the communication interface; and store the digital authentication token within a portion of the memory.

3. The device of claim 1, wherein:

the device further comprises the first sensor, the first sensor being coupled to the at least one processor; and the at least one processor is further configured to execute the instructions to receive, from the first sensor, sensor data captured by the first sensor during the temporal interval, the sensor data comprising the value of the first device parameter.

4. The device of claim 3, wherein the at least one processor is further configured to execute the instructions to:

receive, from the first sensor, additional sensor data captured during an additional temporal interval, the additional sensor data comprising an additional value of the first device parameter detected by the first sensor during the additional temporal interval;

based on the additional sensor data, generate an additional usage parameter characterizing the operation of the device during the additional temporal interval; and generate and transmit, to the computing system via the communications interface, an additional service request that includes the additional usage parameter and the authentication token, the additional service request causing the computing system to validate the authentication token and to perform the operations consistent with the provisioned service and in accordance with the additional usage parameter.

5. The device of claim 1, wherein the at least one processor is further configured to execute the instructions to:

detect a completion of the temporal interval; and based on the detected completion of the temporal interval, generate and transmit the service request to the computing system via the communications interface.

6. The device of claim 1, wherein:

the at least one processor is further configured to execute the instructions to establish, via the communications interface, a communications session with a second sensor across a network;

the second sensor is disposed within an environment in which the device operates; and the second sensor detects a value of a second device parameter that characterizes the operation of the device within the environment.

7. The device of claim 6, wherein the at least one processor is further configured to:

receive, via the communications interface, sensor data from the second sensor during the operation of the device, the sensor data comprising the value of the second device parameter; and generate the usage parameter based on the values of the first and second device parameters.

8. The device of claim 6, wherein the second device parameter comprises at least one of a speed of the device, an acceleration of the device, a geographic position of the device, or a temperature of the device.

9. The device of claim 1, wherein:

the provisioned service comprises a payment service;

the usage parameter comprises an aggregate cost associated with the operation of the device during the temporal interval; and the service request further causes the computing system to initiate a payment transaction in accordance with the aggregate cost.

10. The device of claim 9, wherein the at least one processor is further configured to execute the instructions to:

obtain tariff data associated with the payment service, the tariff data specifying a unit cost for the first device parameter; and compute the aggregate cost based on the value of the first device parameter and the unit cost.

11. The device of claim 1, wherein:

the at least one processor is further configured to execute the instructions to transmit, via the communications interface, a data package that includes the value of the first device parameter to one or more peer computing systems, the data package causing the one or more peer computing systems to perform operations that record the value of the first device parameter within a ledger block of a distributed ledger; and the service request further causes the additional computing system validate the generated usage parameter based on the recorded value of the first device parameter and to perform the one or more operations based on the validation of the generated usage parameter and the validation of the authentication token.

12. A computer-implemented method, comprising:

obtaining, using at least one processor of a device, a value of a first device parameter detected by a first sensor during a temporal interval;

based on the value of the first device parameter, generating, using the at least one processor, a usage parameter that characterizes an operation of the device during the temporal interval; and using the at least one processor, generating and transmitting, to a computing system, a service request that includes the usage parameter and an authentication token associated with a service provisioned to the device, the service request causing the computing system to validate the authentication token, authenticate the device based on the validation, and perform one or more operations in accordance with the usage parameter, the one or more performed operations being consistent with the provisioned service, and the authentication token being indicative of a prior authentication of the device by the computing system.

13. The computer-implemented method of claim 12, further comprising, using the at least one processor, receiving the authentication token from the computing system and storing the authentication token within a memory of the device.

14. The computer-implemented method of claim 12, wherein:

the device includes the first sensor; and the obtaining comprises receiving sensor data from the first sensor, the sensor data being captured by the first sensor during the temporal interval, and the sensor data comprising the value of the first device parameter.

15. The computer-implemented method of claim 12, further comprising:

detecting, using the at least one processor, a completion of the temporal interval; and based on the detected completion of the temporal interval, generating and transmitting the service request to the computing system using the at least one processor.

16. The computer-implemented method of claim 12, wherein:

the computer-implemented method further comprises establishing, using the at least one processor, a communications session with a second sensor across a network;

the second sensor is disposed within an environment in which the device operates; and the second sensor detects a value of a second device parameter that characterizes the operation of the device within the environment.

17. The computer-implemented method of claim 16, wherein:

the computer-implemented method further comprises receiving sensor data from the second sensor using the at least one processor, the sensor data comprising the value of the second device parameter; and the generating comprises generating the usage parameter based on the values of the first and second device parameters.

18. The computer-implemented method of claim 17, wherein the second device parameter comprises at least one of a speed of the device, an acceleration of the device, a geographic position of the device, or a temperature of the device.

19. The computer-implemented method of claim 12, wherein:

the provisioned service comprises a payment service;

the usage parameter comprises an aggregate cost associated with the operation of the device during a corresponding one of the temporal intervals;

the computer-implemented method further comprises:

obtaining, using the at least one processor, tariff data associated with the payment service, the tariff data specifying a unit cost for the first device parameter;

computing, using the at least one processor, the aggregate cost based on the value of the first device parameter and the unit cost; and the service request further causes the computing system to initiate a payment transaction in accordance with the aggregate cost.

20. An apparatus, comprising: a communications interface;

a memory storing instructions; and at least one processor coupled to the communications interface and to the memory, the at least one processor being configured to execute the instructions to:

receive a service request from a device via the communications interface, the service request comprising an authentication token associated with a service provisioned to the device and a usage parameter that characterizes an operation of the device during a temporal interval, the device being configured to generate the usage parameter based on a value of a first device parameter detected by a first sensor during the temporal interval, and the authentication token being indicative of a prior authentication of the device by the computing system;

validate the authentication token, and authenticate the device based on the validation of the authentication token; and based on the authentication of the device, perform one or more operations in accordance with the usage parameter, the one or more operations being consistent with the provisioned service.

\* \* \* \* \*